Aug. 22, 1950   I. STOLEN   2,519,717
WINGED DRAG HITCH FOR HARROWS
Filed May 7, 1947   2 Sheets-Sheet 2

I. Stolen
INVENTOR
BY *CA Snow & Co.*
ATTORNEYS.

Patented Aug. 22, 1950

2,519,717

UNITED STATES PATENT OFFICE 2,519,717

WINGED DRAG HITCH FOR HARROWS

Ingebright Stolen, Wessington Springs, S. Dak.

Application May 7, 1947, Serial No. 746,495

2 Claims. (Cl. 55—93)

This invention relates to a transport for harrows, and more particularly to a wheel and transport adapted to carry the drag sections, which transport may also be utilized as a truck for drawing the harrows in operation.

A primary object of the invention is the provision of an improved truck adapted to be associated with a towing vehicle, by means of which a plurality of harrows may be readily drawn in harrowing a field, and upon which the drag sections and their associated connecting mechanisms may be readily loaded for transport when not in use.

An additional object of the invention is the provision of such a device characterized by means whereby the truck may be readily adjusted from drag to transport position with a minimum of effort and difficulty.

A further object of the invention resides in the provision of means associated with such truck for readily and expeditiously securing drag sections thereto for use in harrowing a field.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Similar reference characters refer to similar parts throughout the several views of the drawings.

Figure 1:
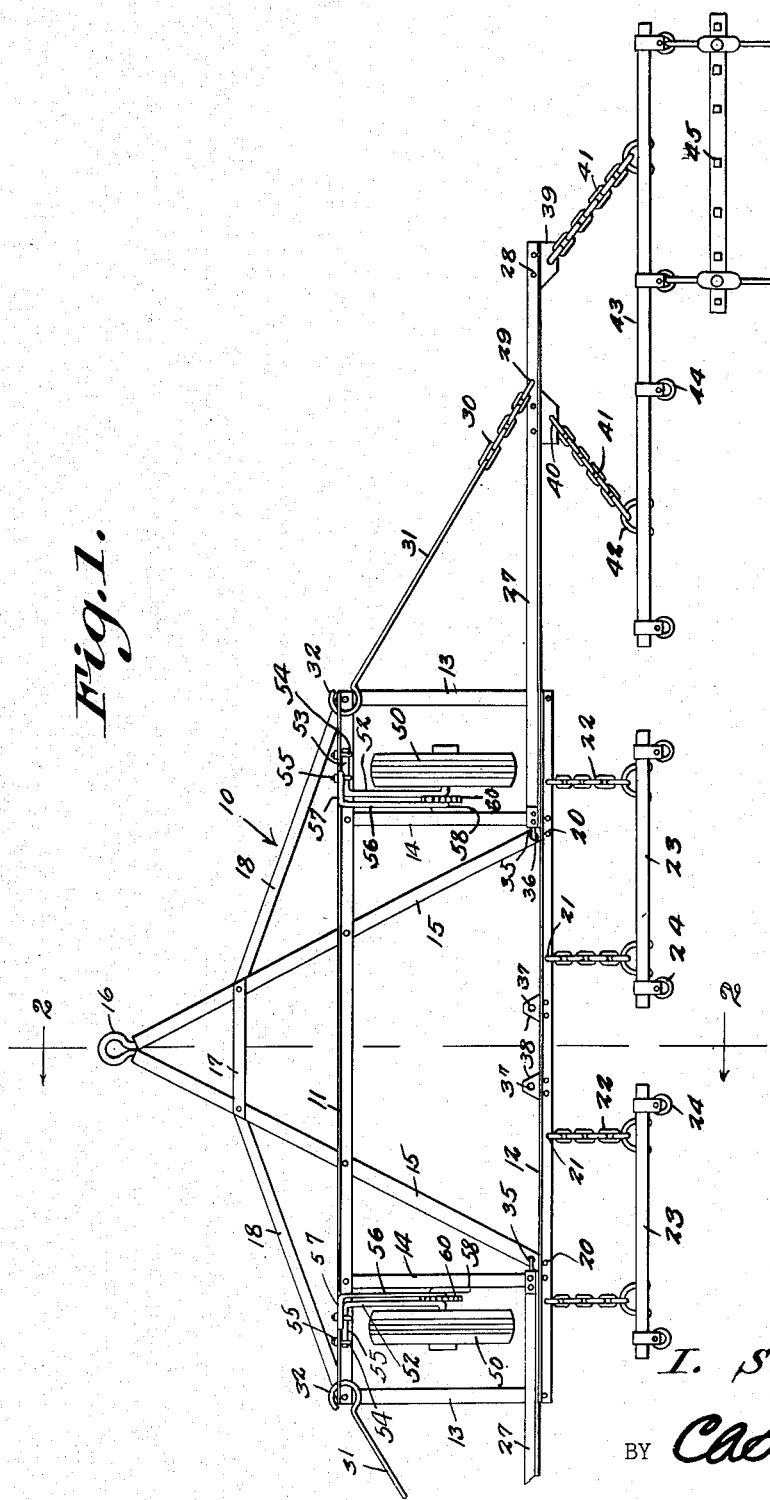
Figure 1 is a top plan view of the truck showing a plurality of towing means for drag harrows associated therewith in operative position.
Figure 2:
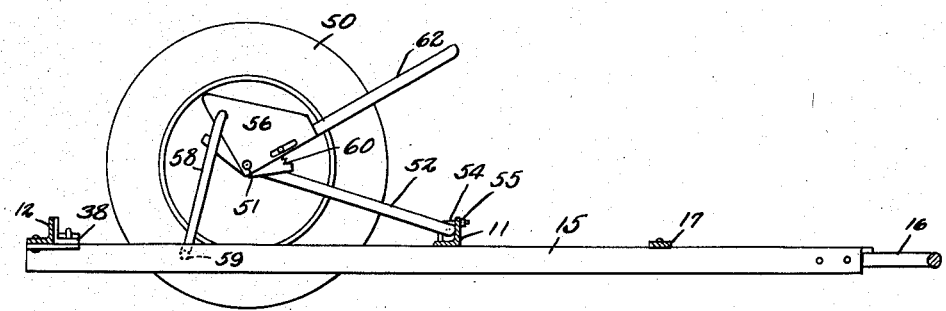
Figure 2 is a sectional view taken substantially along the line 2—2 of Figure 1 as viewed in the direction indicated by the arrows.
Figure 3:
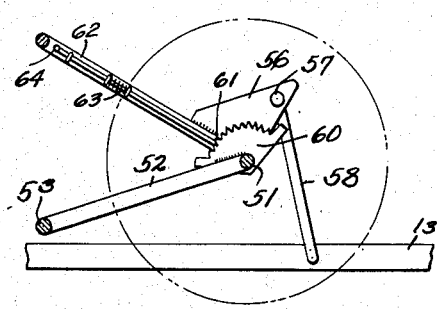
Figure 3 is a fragmentary sectional view taken substantially along the line 3—3 of Figure 1 as viewed in the direction indicated by the arrows.
Figure 4:
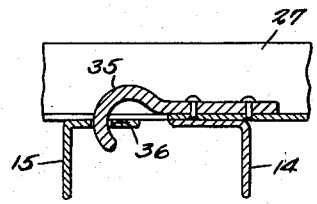
Figure 4 is a fragmentary sectional view disclosing a constructional detail.

Referring now to the drawing, and more particularly to Figure 1, the device of the instant invention comprises a transport truck generally indicated at 10, and including a rectangular frame section comprised of front and rear transverse members 11 and 12, of angle iron or the like, connected at their extremities by end portions 13, and provided with perpendicular wheel supporting and reinforcing members 14.

Angularly inclined towing members 15 are secured to the frame at the juncture of rear member 12 and intermediate members 14, and converge to an eye 16, by means of which the device is adapted to be attached to a towing vehicle such as a tractor or the like.

A reinforcing member 17 connects the members 15 at a point forwardly of the frame, while supplemental reinforcing and supporting members 18 extend from the juncture of members 15 and 17 to the extremities of front members 11.

Angle iron member 12 is provided on the rear of the frame, with a flange extending outwardly from the frame, and having a plurality of spaced apertures 20, adapted to be selectively engaged by hooks 21, carried by chains 22, connected to single drag draw bars 23, provided with eyes 24, to which eyes are adapted to be secured drag harrows.

Extending members 27 are provided, also of angle iron construction, and are adapted to provide extensions for the width of the frame of the transport frame, permitting the association of additional drag harrows therewith.

Each member 27 is comprised of an elongated angle iron section, provided on its inner face with a plurality of apertures 28, in which may be selectively engaged a hook 29, secured to the end of a chain 30, which in turn is secured to a rod 31, provided with a hook 32 adapted to engage in a suitable aperture adjacent the end of the vertical flange of strip iron front member 11.

The inner end of each member 27 is provided with a hook 35 which may be engaged in a suitable aperture 36 in one of the members 15 adjacent its juncture with rear member 12, or which alternatively when the parts are in a different position of adjustment, may be engaged in an aperture 37 in an ear 38 secured to the inner or forward side of the vertical flange of rear member 12.

The vertical flange of member 27 is secured thereto adjacent the outer end thereof, and has facing rearwardly, a pair of apertured ears or lugs 39, within the apertures of which may be secured the hooks 21 of a single draw bar 23, or alternatively hooks 40 secured to chains 41, in turn secured to eyes 42, positioned at spaced intervals on a double draw bar 43, provided with eyes 44, to which may be secured drag harrow portions 45.

It will thus be seen that the arrangement of the device is sufficiently flexible to permit the association of any desired number of drag harrows therewith from one to six as may be desired, the arrangement being indicated in Figure 1, wherein four of the six possible drag harrow attachments are provided.

The transport assembly is adapted to be carried on wheels 50, preferably rubber tired, to permit highway transport, which are mounted on stub axles 51, comprising the right-angled extremities of axle-supporting members 52, which terminate in oppositely disposed right-angled opposite extremities 53, secured in pivotal relation with the front frame member 11 as by a plurality of curved bolts 54, secured in position as by nuts 55.

A triangular plate 56 is secured to each axle, and provided with an aperture engaged by the extremity 57, in pivotal relation, of a rod 58, the opposite end of which is provided with a right-angled portion 59 journalled for rotation in a suitable aperture in frame member 14.

A toothed quadrant 60 is mounted on the stub axle 51, the teeth of which are adapted to be engaged by a detent 61, carried by a rod 62, spring pressed inwardly into engagement with the teeth by means of a spring 63, and provided with a release handle 64, the rod and spring being secured in suitable brackets 65 carried by an operating handle member 66, provided with a right-angled portion 67 adjacent the portion 64, the arrangement being such that the compression of the portions 64 and 67 releases the detents 61 from the teeth of the quadrant 60.

Obviously, the arrangement is such that movement of the handle 66 and corresponding movement of triangular plate 56, will, through the pivotal connection of the members 52 and 58 vary the relative height of the entire frame assembly relative to the axles, and consequently, the distance of the assembly above the ground.

The device has hitherto been described in conjunction with Figure 1, that is, in operative position adapted for the towing of drag harrows over the field or the like.

Figure 5:
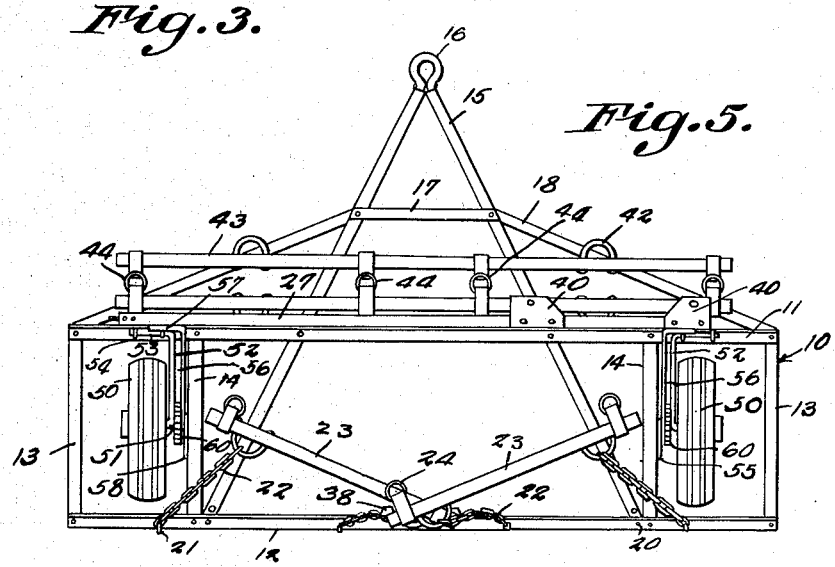
Figure 5 is a top plan view similar to Figure 1, but showing the parts of the apparatus in transport position, the drag harrow sections being removed for the sake of clarity of illustration.

However, when it is desired to transport the harrows from one locality to another, the frame is raised in the manner previously described by means of the handle 66, and the parts positioned in substantially the relation shown in Figure 5, the bars 23 remaining secured to rear members 12 as by their chains 22, and positioned in angular relation across the members 15 and the ears 38.

The double draw bars 43, and the extension members 27 are positioned in the manner as shown forwardly of the forward frame member 11, and resting on the angle iron supports 15 and 18.

The drag harrows may then be suitably positioned over the entire assembly, between the wheels 50, and the device is then ready to be towed to any desired locality.

Obviously, the parts may be permitted to merely rest on the frame on occasional short journeys, or may be suitably secured thereto as by wiring or roping if desired for longer journeys.

From the foregoing, it will now be seen that there is herein provided an improved transport for harrows which permits the ready packing and transporting of such harrows, without the necessity of utilizing a separate truck or other vehicle, and which accomplishes all the objects of this invention, and others, including many advantages of great practical utility in commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. A harrow of the class described, comprising a main wheel-supported frame, embodying spaced front and rear bars, end bars connecting the front and rear bars at their ends, said front and rear bars having openings, drag harrow supporting sections mounted at the ends of the frame, each drag harrow supporting section embodying a bar, a hook on one end of the bar of the drag section, and being hooked into one of said openings of the main frame, the bar of the drag section resting on an end bar of the main frame holding the bar of the drag supporting section in a horizontal position, a rod hooked into an opening of the front bar, means for adjustably connecting the rod to the bar of the drag harrow supporting section, holding the bar of the drag harrow supporting section against rearward movement while in use, drag harrow members removably connected to the bar of the drag harrow supporting section, and said drag harrow supporting section adapted to be swung upwardly and inwardly resting on the main wheel-supported frame for transportation.

2. A harrow of the class described, comprising a main wheel-supported frame embodying spaced front and rear bars, end bars connecting the front and rear bars securing the front and rear bars in spaced relation with respect to each other, drag harrow supporting sections, each of said drag harrow supporting sections embodying a main bar having a hook at one end thereof, said main wheel-supported frame having openings, said hook adapted to be placed in one of the openings securing the drag harrow supporting section to the wheel-supported frame, a rod having a hook at one end, hooked into an opening of the main wheel-supported frame, means for removably connecting the opposite end of the rod to the drag harrow section, at the front bar thereof, said rod restricting rearward movement of the drag harrow supporting section, and said drag harrow supporting sections adapted to swing upwardly into position on the wheel-supported frame for transportation.

INGEBRIGHT STOLEN.

REFERENCES CITED

The following references are of record in the file of this patent:

UNITED STATES PATENTS

| Number | Name | Date |
|---|---|---|
| 1,080,429 | Edwards et al. | Dec. 2, 1913 |
| 1,489,053 | Altgelt | Apr. 1, 1924 |
| 1,636,802 | Bozard | July 26, 1927 |
| 1,732,989 | Scrabeck | Oct. 22, 1929 |
| 1,878,346 | Swanson | Sept. 20, 1932 |
| 1,953,053 | Linn | Mar. 27, 1934 |